(12) United States Patent
Venables et al.

(10) Patent No.: US 7,535,842 B1
(45) Date of Patent: May 19, 2009

(54) METHOD AND SYSTEM FOR MERGING BANDWIDTH IN MULTIPLEXING FLOWS

(75) Inventors: Bradley Venables, Nepean (CA); David Stuart, Almonte (CA); Graham Thomsen, Kanata (CA); Hamid Assarpour, Arlington, MA (US)

(73) Assignee: Nortel Networks Limited, St. Laurent, Quebec (CA)

( * ) Notice: Subject to any disclaimer, the term of this patent is extended or adjusted under 35 U.S.C. 154(b) by 608 days.

(21) Appl. No.: 11/101,993

(22) Filed: Apr. 8, 2005

Related U.S. Application Data

(60) Provisional application No. 60/561,039, filed on Apr. 9, 2004.

(51) Int. Cl.
  *G01R 31/08* (2006.01)
  *H04J 3/02* (2006.01)
(52) U.S. Cl. .................... 370/230.1; 370/537
(58) Field of Classification Search ........... 370/230.1, 370/229–230, 231–232, 537–538, 535–536, 370/412–419
See application file for complete search history.

(56) References Cited

U.S. PATENT DOCUMENTS

| | | | | |
|---|---|---|---|---|
| 5,633,867 A * | 5/1997 | Ben-Nun et al. | ............ | 370/399 |
| 5,825,748 A * | 10/1998 | Barkey et al. | ............... | 370/236 |
| 5,898,670 A * | 4/1999 | Hoebeke et al. | ............. | 370/468 |
| 5,978,359 A * | 11/1999 | Caldara et al. | ............... | 370/236 |
| 6,002,692 A * | 12/1999 | Wills | ......................... | 370/465 |
| 6,009,108 A * | 12/1999 | Takehara et al. | ............ | 370/538 |
| 6,064,650 A * | 5/2000 | Kappler et al. | ............. | 370/232 |
| 6,118,786 A * | 9/2000 | Tiernan et al. | ............. | 370/416 |
| 6,324,165 B1 * | 11/2001 | Fan et al. | ..................... | 370/232 |
| 6,327,275 B1 * | 12/2001 | Gardner et al. | ............. | 370/535 |
| 6,754,239 B2 * | 6/2004 | Negishi et al. | ............. | 370/537 |
| 7,092,387 B2 * | 8/2006 | Chen et al. | .................. | 370/360 |
| 2002/0031146 A1 * | 3/2002 | Abbas et al. | ................ | 370/476 |
| 2002/0036984 A1 * | 3/2002 | Chiussi et al. | .............. | 370/232 |
| 2004/0032875 A1 * | 2/2004 | Bly et al. | .................... | 370/412 |
| 2004/0114517 A1 * | 6/2004 | Grosbach et al. | ......... | 370/230.1 |

* cited by examiner

*Primary Examiner*—Kwang B Yao
*Assistant Examiner*—Candal Elpenord
(74) *Attorney, Agent, or Firm*—Withrow & Terranova, P.L.L.C.

(57) ABSTRACT

Improved systems and methods for processing data traveling in a network in an efficient manner are provided. In many network implementations input/output ports have one or a small number of bandwidths. These ports sometimes lead to higher bandwidth ports than the source or destination needs. A method and system are provided wherein some of the input and output ports are known to be underutilized. Only a relatively small number of output ports require a complicated merge scheduler that provides configurable data transmission "fairness" between input ports. Accordingly, a method and system are provided wherein preprocessing of input data reduces the cost of the merge circuits required at the outputs.

28 Claims, 6 Drawing Sheets

METHOD AND SYSTEM FOR MERGING BANDWIDTH IN MULTIPLEXING FLOWS

CROSS-REFERENCE TO RELATED APPLICATION

This application claims priority from co-pending, commonly assigned, provisional patent application Ser. No. 60/561,039 entitled "Method and System for Merging Bandwidth in Multiplexing Flows" filed Apr. 9, 2004, which is incorporated herein by reference.

FIELD OF THE INVENTION

The present invention relates to network communications and in particular to providing systems and methods for multiplexing data traveling in a network in an efficient manner. In this context data includes all services and applications which traverse the network as data, including but not limited to voice, video, and computer information transfer.

BACKGROUND OF THE INVENTION

In a telecommunications multiplexer or switch, complicated strategies are often used to merge data of different classes of service and different source-destination pairs in a fair and efficient manner. Circuits implementing these strategies are typically expensive and difficult to design and configure. The complexity and cost of the implementation is typically driven by the number of input and output links and the capacity, or bandwidth, of the links. A number of these exemplary circuits are illustrated below.

FIG. 1 illustrates a typical generic multiplexer inward flow configuration in which a number of downlink inputs 10, 11, 15 are connected to a data selector 20. The data selector 20 may, for example, comprise a scheduler, a time division multiplexer ("TDM") merge, or similar device known to those of ordinary skill in the art. The data selector 20 outputs data in an uplink output 30.

FIG. 2 illustrates a typical generic multiplexer outward flow configuration in which an uplink input 40 is connected to a data forwarding device 50. The data forwarding device 50 may, for example, comprise a router, sprayer, selector, or similar devices known to those of ordinary skill in the art. The forwarding device 50 outputs a number of downlink outputs 60, 61, 65.

FIG. 3 illustrates a typical generic multiplexer with a bidirectional flow configuration in which a number of bidirectional downlinks 70, 71, 75 are connected to a multiplexer 80 which is also connected to bidirectional uplink 90. The multiplexer 80 and bi-directional data flows 70, 71, 75, 90, or similar devices, are known to those of ordinary skill in the art.

FIG. 4 illustrates a switch constructed with an array of multiplexers. Specifically, a number of data inputs, such as data channels 100, 102, 110, are each connected by data link connections 101, 103, and 111, respectively, to multiplexers 120, 122, and 124. The multiplexers sort the data and provide data channel outputs 130, 131, and 135, respectively. Generally, the multiplexer has more inputs on the left side of FIG. 4 and these represent the down links; the right side outputs representing the up links. The defining characteristic of a multiplexer, which differentiates it from a switch, is the merge of data from many sources down to a destination. For example, a multiplexer is represented by Multiplexer 120 which accepts data from input links 100, 102, and 110; and merges the data onto link 130.

FIG. 5 illustrates a multiplexer configuration which utilizes "brute force" processing. In FIG. 5, a number "N" data sources illustrated by data sources 200, 200B, 201, 201B, 202, 202B, are provided. Each of the data sources 200, 201, and 202 provide a data flow 210, 211, 212 each data flow having a designated bandwidth. The data flows 210, 211, 212 are connected to forward multiplexers 220, 221, 222 which distribute data to one or more data queues 240, 241, 242, 243, 244, and 245 via data channels 230, 231, 232, 233, 234, and 235. Furthermore, each data queue provides a flow control connection to the respective data source to protect the data queue from overflow. For example, data queues 240, 241, 242, 243, 244, and 245 provide flow control through data link connections 260, 261, 262, 263, 264, and 265 to data sources 200, 200B, 201, 201B, 202, 202B respectively.

Data queues 240, 241, 242 provide a data output to scheduler 270 through data connections 250, 251, and 252 respectively. Likewise, data queues 243, 244, 245 provide a data output to scheduler 271 through data connections 253, 254, and 255 respectively. Each scheduler 270, 271 provides flow merge where more bandwidth is offered than can be transmitted. Each scheduler provides data output over data channel 280, 281 to destination 290, 291, respectively.

Each of these configurations has limitations, especially when handling higher bandwidth data traffic. In light of the foregoing, there is a need for improved systems and methods for processing data traveling in a network in an efficient manner. Specifically, there is a need for simple, efficient merge circuits that utilize available bandwidth in an efficient manner.

SUMMARY OF THE INVENTION

The present invention provides improved systems and methods for processing data traveling in a network in an efficient manner. In many data networking implementations input and output ports have one or a small number of common bandwidths. The use of fixed bandwidth ports sometimes results in higher bandwidth capacity in a port than is required to carry the data from the source to the destination. Therefore, according to aspects of the present invention, a method and system is provided wherein some of the input and output ports are known to be underutilized or undersubscribed. According to the present invention, only a relatively small number of output ports require a complicated merge scheduler that provides configurable data transmission "fairness" between input ports. Using these network aspects in a novel manner, the present invention provides a method and system wherein preprocessing of input data where under subscription exists reduces the overall system cost. The oversubscribed (scheduled) merge circuits only need to be deployed at the oversubscribed outputs instead of at all outputs. Some of the undersubscribed flows can be premerged to reduce the number of data ports that arrive to the oversubscribed merge circuits. In the context of the present invention, data includes all services and applications which traverse the network as data, including but not limited to voice, video, and computer information transfer.

According to an aspect of the present invention, preprocessing is performed by rate shaping circuits and undersubscribed merge circuits. The rate shaping circuits smooth input data on underutilized links. The undersubscribed merge circuits combine data from multiple input links onto one aggregate input link for presentation to the merge circuit. According to another aspect, the undersubscribed merge circuits give previously merged data priority access to an output link over other sources thus leaving the other sources to share the remaining bandwidth. According to another aspect, undersubscribed bandwidth merge circuits can be used alone or cascaded.

According to other aspects of the present invention, a telecommunications multiplexer or switch system is provided comprising undersubscribed bandwidth merge circuits, rate limited data sources, and oversubscribed merge circuits. According to another aspect, the oversubscribed merge circuit is comprised of a scheduler circuit, input queues per unshaped source or group of shaped sources, and a method of flow controlling sources based on queue congestion.

According to another aspect, the method of flow controlling sources based on queue congestion is a credit based flow control method. According to another aspect, credit based flow control may have a configured number of credits per source/destination pair and the queue is sized to always accept all of the data represented by the sum of the credits for sources sending data to that queue. According to another aspect, the credit loop is data flow from a source to a destination queue and credits flowing back to the source for the destination when data for this source destination pair exits the queue. According to another aspect, the credits can flow back to the source in-band with data in the reverse direction, out-of-band in a messaging channel, or out-of-band in a different bus or network.

According to another aspect, the method of flow controlling a source based on queue congestion is queue fill threshold triggered. According to another aspect, the threshold is configured per source of data. According to another aspect, the threshold is configured per source of data or group of sources sharing an undersubscribed bandwidth merge circuit.

According to another aspect, the undersubscribed bandwidth merge circuit is comprised of one or more data flows arriving from one or more sources over one or more links, a mechanism for delaying data per source when momentary merge conflicts arise, a data selection circuit, and a departing data flow containing all of the arriving data.

According to another aspect, the data selection circuit may be a scheduler device or circuit. Furthermore, according to another aspect, the scheduler may have a simple round robin algorithm between queues with data. According to another aspect, the scheduler may have a weighted round robin algorithm between queues with data and the weight is dynamic and proportional to the depth of the queues. In another aspect, the weight does not include any component configured per source. According to another aspect, the scheduler may select the data in the order of arrival in order to minimize latency.

According to another aspect, the departing data flow can be distributed to one or more queues for the next (cascaded) level of merge processing.

According to another aspect, the sum of the bandwidths of the links carrying arriving data is larger than the bandwidth of the link carrying departing data, even though the sum of the bandwidths of arriving data is less than or equal to the bandwidth of the link carrying departing data.

According to other aspects of the present invention, a telecommunications multiplexer or switch system is provided comprising one or more undersubscribed bandwidth merge circuits, two or more rate limited data sources and one or more oversubscribed merge circuits Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure.

According to a preferred embodiment of the present invention, data traffic preprocessing is performed by rate shaping circuits and undersubscribed merge circuits. The rate shaping circuits smooth input data on underutilized links. The undersubscribed merge circuits combine data from multiple input links onto one aggregate input link for presentation to another merge circuit. In another step, undersubscribed merge circuits give previously merged data priority access to an output link over other sources thus leaving the other sources to share the remaining bandwidth. In each case, for the undersubscribed bandwidth merge the sum of the offered data does not exceed the capacity of the receiving link.

Using this preferred embodiment, the invention makes use of undersubscribed merge circuits to reduce the cost of oversubscribed (scheduled) merge circuits, and in some cases remove the need for the oversubscribed merge circuits entirely. Simplicity in configuring the undersubscribed merge circuits is a benefit of the invention, enabling remote location of an undersubscribed merge circuit where the most benefit can be gained by the reduction in transmission capacity after the undersubscribed merge circuit.

Figure 6:
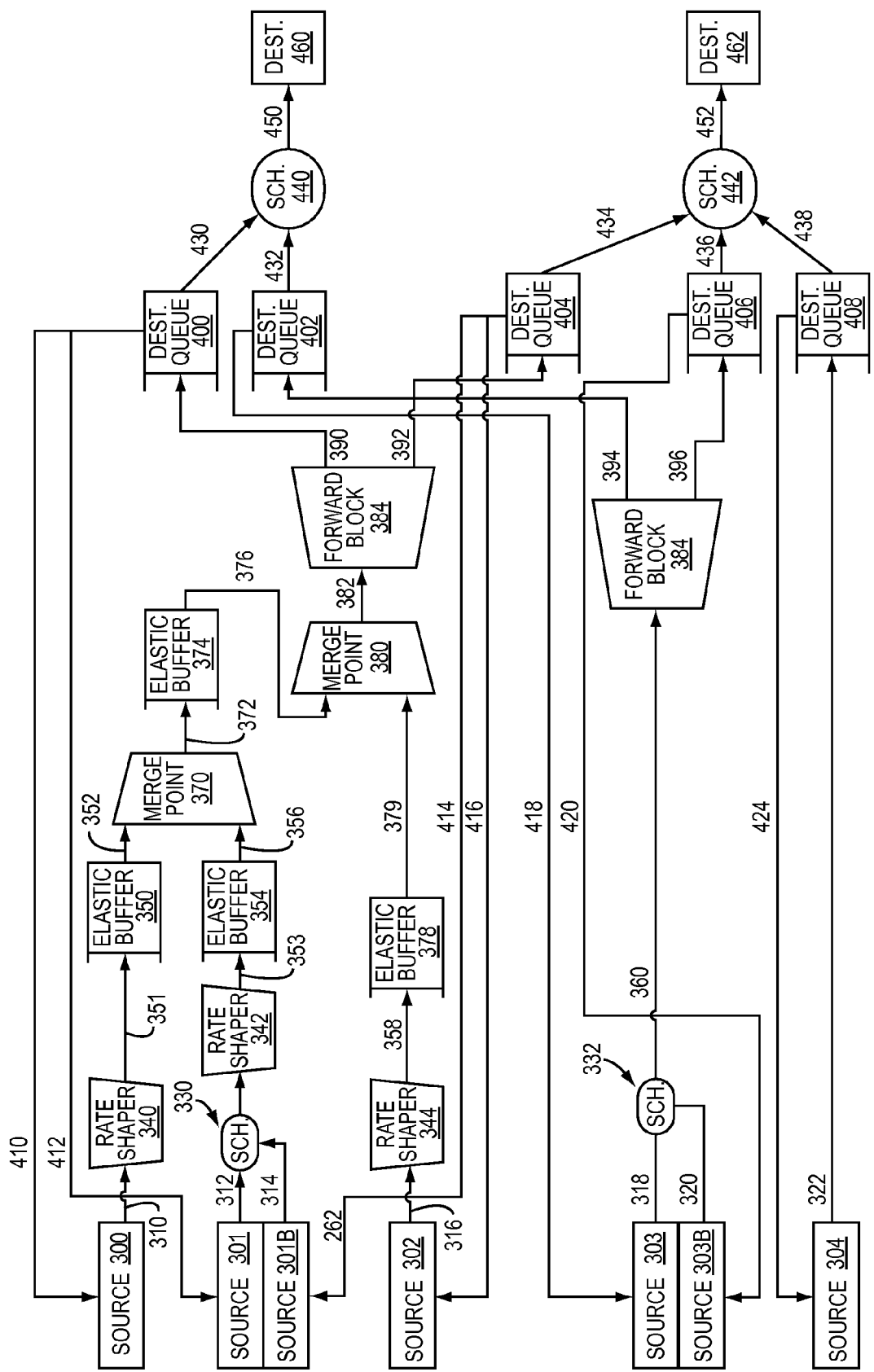
FIG. 6 illustrates an embodiment of aspects of the present invention.

FIG. 6 depicts a method and system according to the preferred embodiment of the present invention. As illustrated in FIG. 6, data traffic sources 300, 301, 301B, 302, 303, 303B, 304 are located on the left and traffic destinations 460, 462 are located on the right. Those of ordinary skill in the art will recognize that data traffic sources and destinations may be physically located at a variety of places within a data network. For example, the sources and destinations may be located on different cards of a telecommunication switch or in different components of a telecommunications network.

In the preferred embodiment illustrated in FIG. 6, the data communications links (e.g., wires, optic cable, etc.) carrying data from the sources to the merge point typically have the capacity to carry more traffic than can be merged at an undersubscribed merge, however rate shaper circuits located at the sources are configured to rate shape the data from the sources to rates which do merge easily. The window over which the data must conform to its peak rate is system specific and corresponds to the size of an elastic buffer located at a merge point. This configuration is explained in greater detail below.

Figure 1:
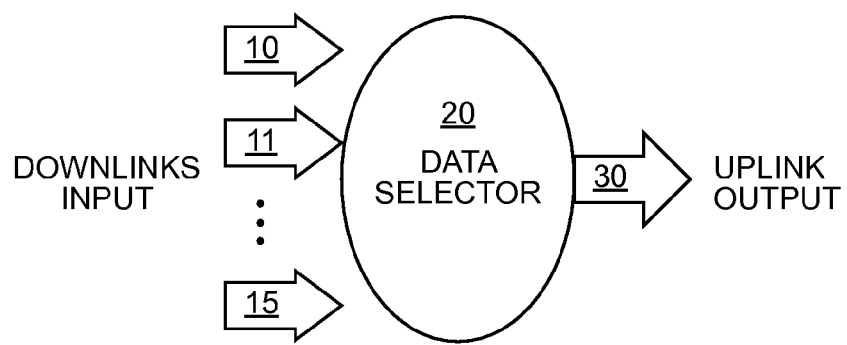
FIG. 1 illustrates inward flow to a generic multiplexer.
Figure 2:
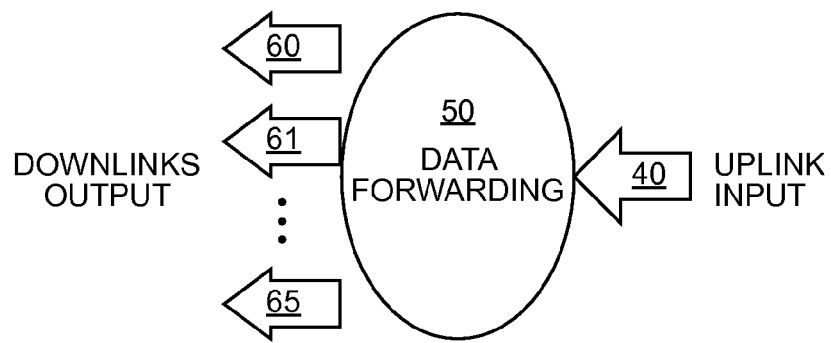
FIG. 2 illustrates outward flow from a generic multiplexer.
Figure 3:
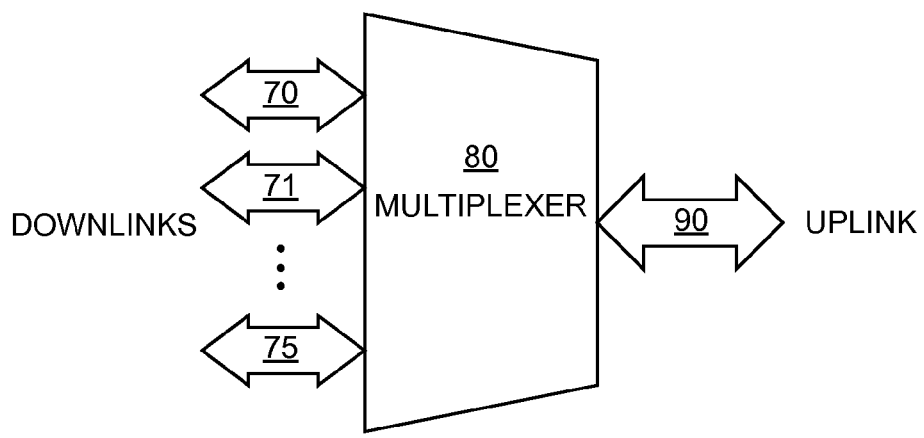
FIG. 3 illustrates bidirectional flow to and from a generic multiplexer.
Figure 4:
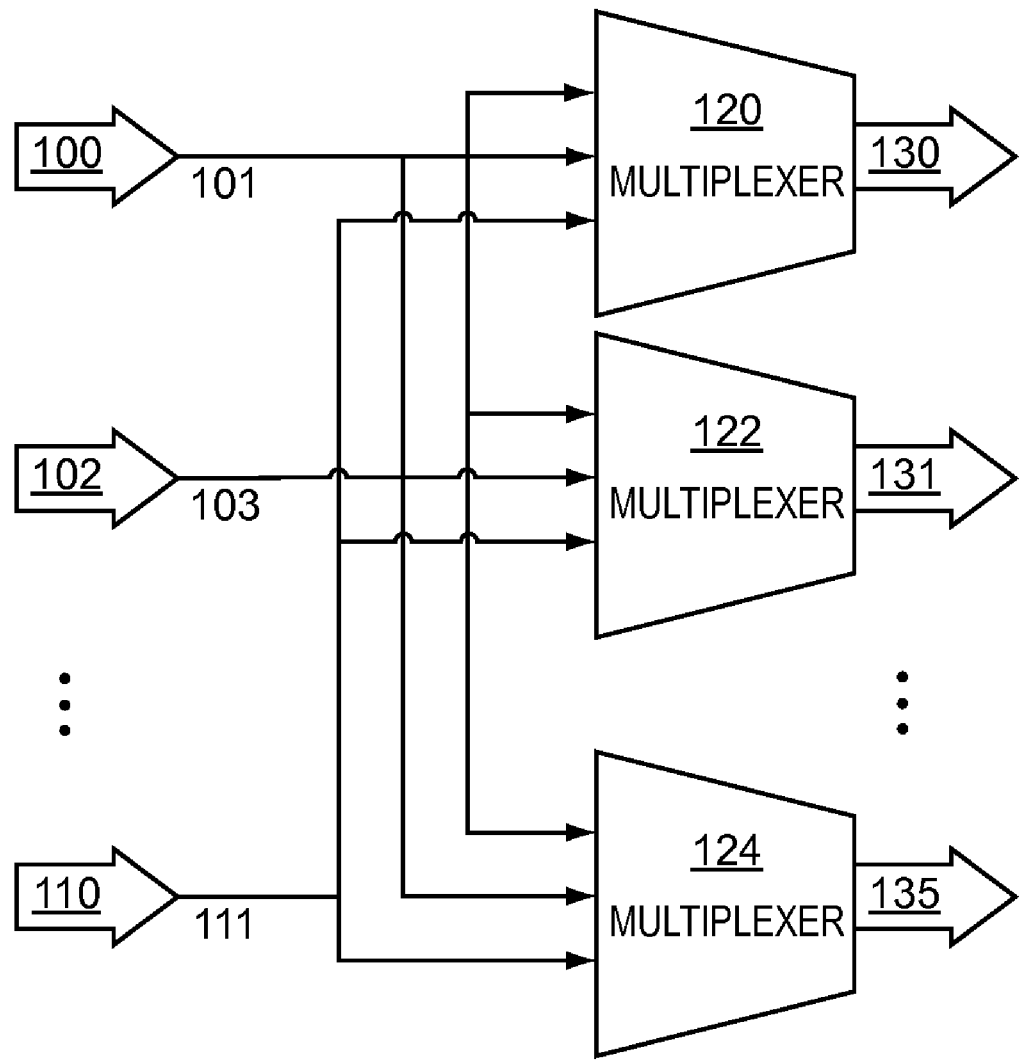
FIG. 4 illustrates a switch comprising an array of multiplexers.
Figure 5:
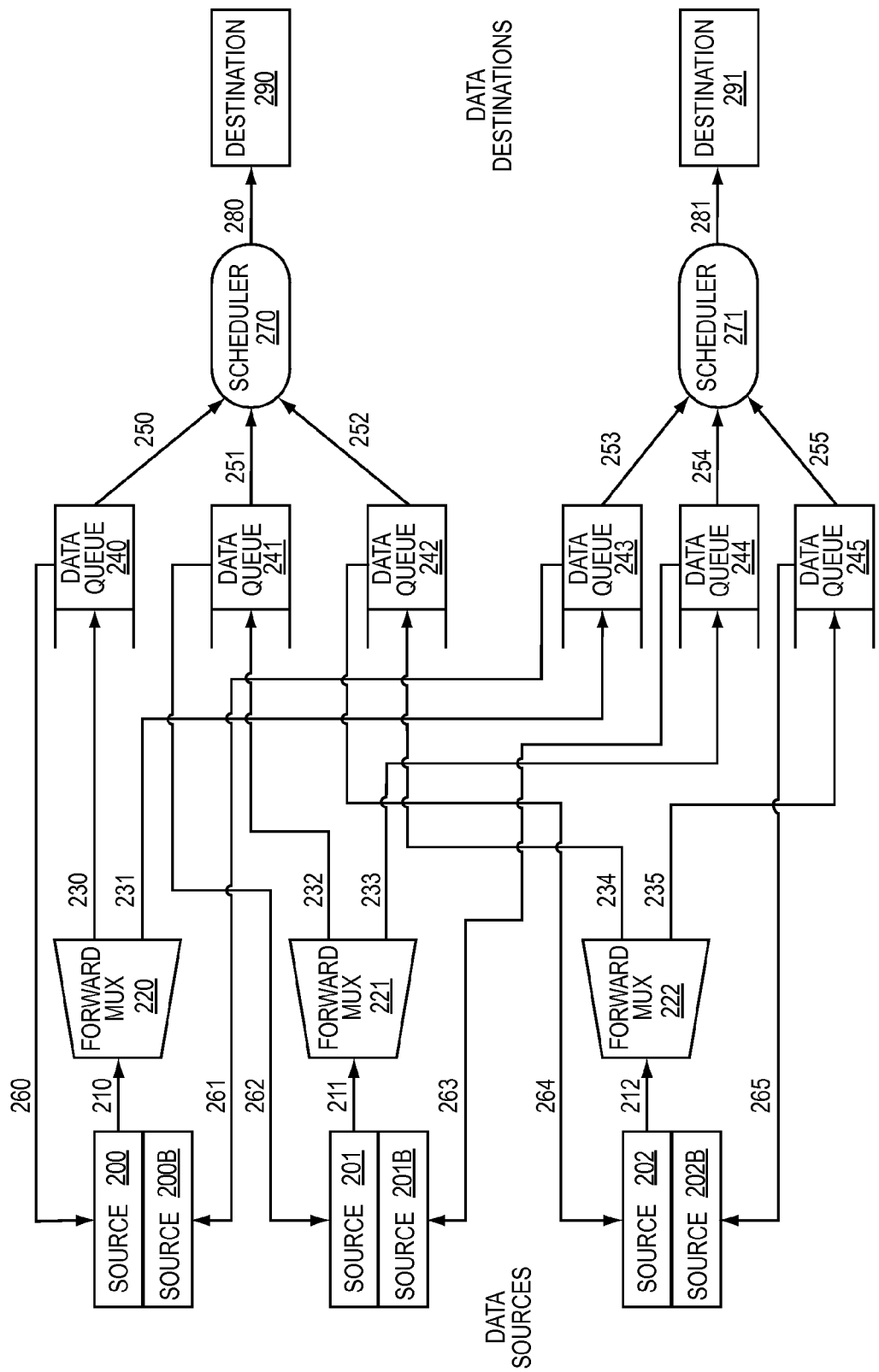
FIG. 5 illustrates a "brute force" implementation of a multiplexer.

Between the data traffic sources 300, 301, 301B, 302, 303, 303B, 304 and data traffic destinations 460, 462 the data offered from the various sources 300, 301, 301B, 302, 303, 303B, 304 is merged into the bandwidth reception capability of the intermediate processing receivers thereby providing for efficient data traffic handling. Specifically, the bandwidth merge depicted in FIG. 1 has two facets: the oversubscribed merge and the undersubscribed bandwidth merge.

According to FIG. 6, data from sources 301, 301B is transmitted over data communications links 312, 314, respectively, to scheduler 330 for flow merger. At this point more bandwidth is offered than can be transmitted further downstream. Similarly, data from data from sources 303, 303B is transmitted over data communications connections 318, 320, respectively, to scheduler 332 for flow merger where more bandwidth is offered than can be transmitted further downstream. These are examples of the oversubscribed merge.

A switch or multiplexer uses the scheduler methodology where each data source, e.g., data sources 301, 301B, interacts directly with a scheduler, e.g., scheduler 330, typically with a queue collocated with the scheduler and flow control provided. The methodology could also be provided through source grooming such as through rate shaper 342 based on congestion messages from the scheduler 330. An elastic buffer 354 may also be provided to provide data buffering to the output of the rate shaper 342.

According to the preferred embodiment of the present invention illustrated in FIG. 6, the data sources 301, 301B may send data to two different destinations 460, 462. Data source 301 sends data to destination 460, while data source 301B sends data to destination 462. Scheduler 330 is used to select between the two flows based on local priorities and service level requirements. Within the data flow from sources 301, 301B there can be many finer grained flows which are not important to this level of system view.

The aggregate of all data traffic from data sources 301 and 301B are shaped by rate shaper 342 to a peak rate during transmission over data communications connections to elastic buffer 354 towards a data traffic merge point 370.

A data communications link 353 carries data flowing at a given bandwidth between the rate shaper 342 and the elastic buffer merge queue 354. The link 353 could support more traffic bandwidth than the rate shaper 342 is transmitting or it could be carrying the peak bandwidth of the data communications link 353. In the latter case, the rate shaper 342 is not required. For example, in a switch fabric, typically the data communications links leaving the sources towards the merge points are the same bandwidth from every source independent of the offered traffic, therefore and in this typical case a rate shaper circuit would be needed to limit the offered traffic.

Unused bandwidth on the link 353 is typically filled with idle characters. Those of ordinary skill will understand that the data communications links, e.g., link 353, could be long links such as an optical fiber interconnects or a short distance link such as where the links are co-located with the rate shaper circuits.

As illustrated in FIG. 6, data source 300 is another data source on the network and is connected to a rate shaper 340 over data communication connection 310. Rate shaper 340 is further connected to an elastic buffer 350 over another data communications connection. The output of the elastic buffer 350 is connected to the merge point 370 over data communications connection 352.

The merge point 370 merges data from one or more bandwidth data transmission paths, e.g., data communications paths 352, 356, into a single bandwidth data transmission path, e.g., data connection 372. The merge point 370 merges data flows from sources 301 and 301B carried over data communications connection 356 and from data source 300 carried over data communications connection 352. The data flow from sources 300, 300B may encounter little latency as the data flow from source 300 has also been passed through rate shaper circuit 340 which may make the data merge onto the data link 372. The rate shaper circuits, 340, 342 are designed to guarantee a density of data within a small window of time. The smaller the window, the smaller the required buffer 350, 354 will have to be.

This methodology is intended to be easy to configure so there is no system knowledge configured into the undersubscribed merge point. The job of the merge point is simply to forward data from receive queues into a single merged data stream in a work conserving fashion. Work conserving means that if any data is present in the receive queues, then data must be found to send out the merged flow or in other words the merged flow cannot contain idle data if any of the received queues have real data.

At the merge point, there is typically no knowledge of source bandwidths and there is typically no knowledge of traffic priorities. Thus, the undersubscribed bandwidth merge can be implemented as bump-in-the-line, which means that it doesn't have to be collocated with any network intelligence, including the traffic source and the traffic destination.

In telecommunication transport systems, a common method of merging flows is called time division multiplexing, where each of the flows to be merged is allocated specific slots in time within the merged flow where the input data should be put. This is a strict merge of data where the sum of the bandwidths of offered flows is less than or equal to the bandwidth of the merged flow. This is a very strict implementation of an undersubscribed bandwidth merge.

The merge point 370 may employ a merge algorithm that is a simple round robin search for data, or it could use an algorithm which is sensitive to the slip buffer depth. Those of ordinary skill in the art will realize that other types of algorithms could be employed; however, it is important that the merge algorithm be capable of finding data in the data queues, e.g., data queues 350, 354, fast enough to ensure no data is lost while putting data into the merged link.

As also illustrated in FIG. 6, data source 302 is another data source on the network and is connected to a rate shaper 344 over data communication connection 316. Rate shaper 344 is further connected to an elastic buffer 378 over data communications connection 358. The data link output 379 of the elastic buffer 350 is connected to another merge point 380. The merge point 380 also merges data from one or more bandwidth data transmission paths, e.g., data communications paths 376, 379 into a single bandwidth data transmission path, e.g., data connection 382. The data flow over data link 376 is merged with data flow over data link 379. As illustrated the data flow from source 302 is also a shaped flow which more easily merges with the data flow through link 376. The resulting merged data flow is transmitted over data link 382.

A forwarding block 384 is provided to forward the data transmitted over data communications link 382 to a data destination queue required for each piece of data, e.g., 400, 402, 404, 406, 408. For example the data from sources 301, 301B which is transmitted to destination 460 may have a header attached to it which indicates that the destination is 460. Forward block 384 is capable of locating the header and forwarding that piece of data to a destination 460 queue, e.g. 400, 402. According to a preferred embodiment, a single destination queue, e.g. destination queue 400, is shared by all of the flows merged prior to forward block 384, e.g., data flows from sources 300, 301, 301B.

There will be different destination queues for data flows from sources 303, 303B, and 304 as they have not been pre-merged in the undersubscribed merge method. As illustrated, data from sources 303, 303B is transmitted over data communications connections 318, 320, respectively, to scheduler 332 for flow merger where more bandwidth is offered than can be transmitted further downstream. The data then travels over data link 360 to Forwarding block 386 which distributes the data over links 394 and 396 to data queues 402 and 406 respectively.

As illustrated in FIG. 6, data from Source 304 is not preprocessed, but rather is transmitted over data link 322 to data queue 408. Thus, FIG. 6 illustrates a number of possible processing and preprocessing schemes in which the present invention may be utilized.

The output from destination queues 400, 402 are output over data links 430, 432 to a scheduler 440 that schedules traffic for destination 460. Data from scheduler 440 is connected to destination 460 via data communications link 450. Bandwidth on the output of scheduler 440 is no longer guaranteed as scheduler 440 is a full merge scheduler that is making decisions which limit the amount of bandwidth towards destination 460. If all of the offered data fits onto the data communications link 450, then there is no flow control back to the sources.

If, however, there is more traffic offered than fits onto data communications link 450, then scheduler 440 chooses which traffic to send. The scheduler 440 could choose traffic based on priority or based on bandwidth mixing, but the destination data queues 400, 402, will be building as more data is arriving than departing. The depth of the destination data queues 400, 402, is managed by exerting flow control back to the sources.

At the data queues 400, 402, 404, 406, 408, data traffic may be returned to sources 300, 301, 301B, 302, 303, 303B and 304 over data links 410, 412, 414, 416, 418, 420, and 424, respectively, where more traffic offered than fits onto data communications link. This flow control protects the data queue. In some embodiments, however, with shaped sources and appropriate scheduling, it is possible to eliminate the need for flow control links back to the various sources.

Typically, each source, e.g., sources 300, 301, 301B, 302, will have a separate configuration of flow control threshold or credit count to manage how much data is queued from each source. Even for the case where pre-merged flows share a queue, such as data flows from sources 300, 301, 301B, the system complexity is simplified by giving each source a separate threshold or credit count. However, it is possible for the pre-merged flows to share thresholds at the expense of more complicated source shaping mechanisms. In the shared threshold case, the sources must respond to congestion in a way which adequately compensates for time-of-flights in the forward data and reverse flow control loop, probably through a proportional back off scheme.

It is also possible to avoid flow control to shaped sources altogether if the oversubscribed (scheduled) merge can guarantee the entire shaped rate of the source. The oversubscribed merge can guarantee that flow control is not necessary by implementing priority selection of data or by allocating a weight to the shaped flows which is a high enough portion of the bandwidth that the full rate will be accepted. Due to the complex nature of the oversubscribed merge and the burstiness of the undersubscribed merge, there is usually a queue required into the oversubscribed merge even if the flow control is not necessary.

Figure 7:
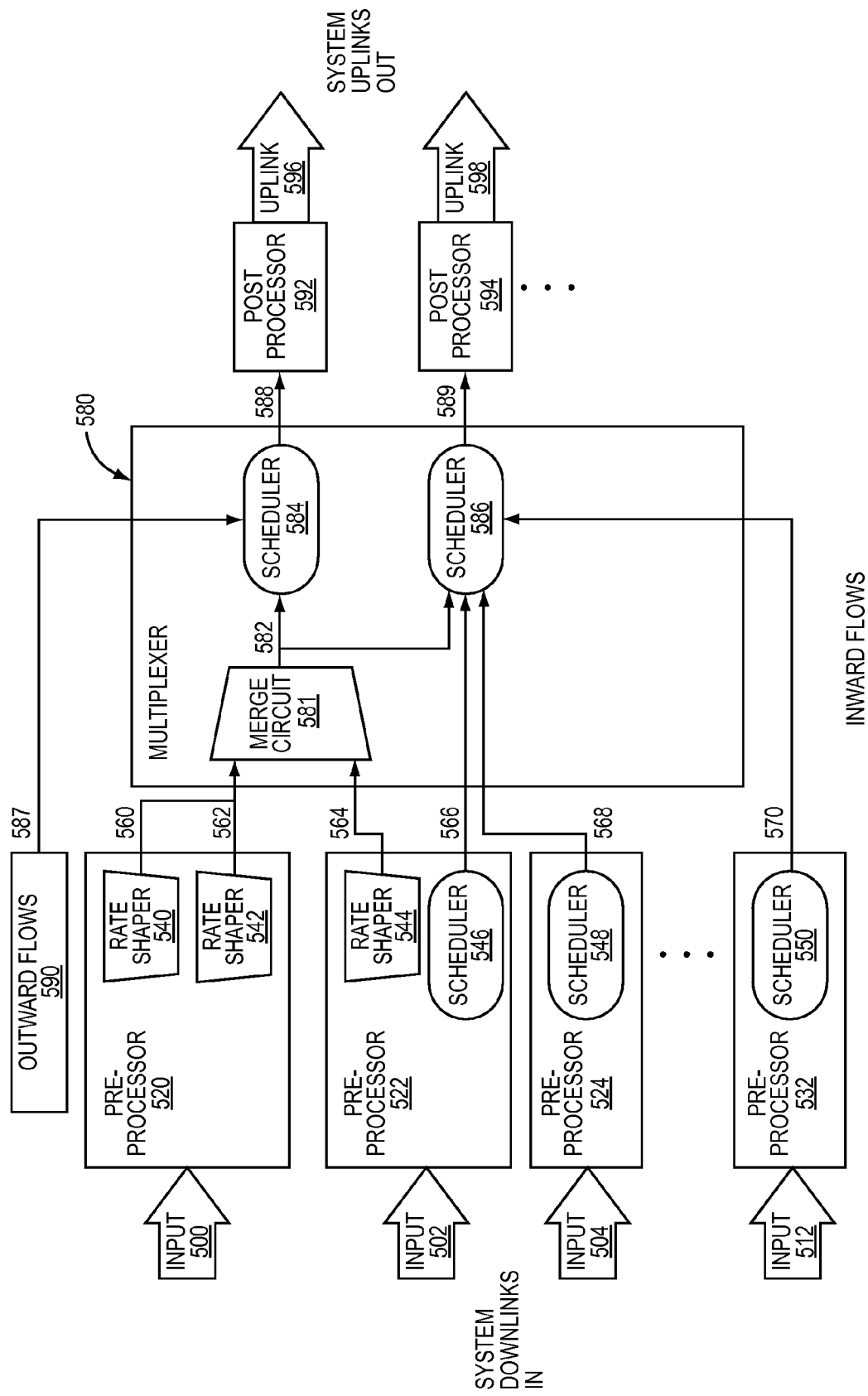
FIG. 7 illustrates an embodiment of aspects of the present invention, including the system unidirectional flow into a multiplexer.
Figure 8:
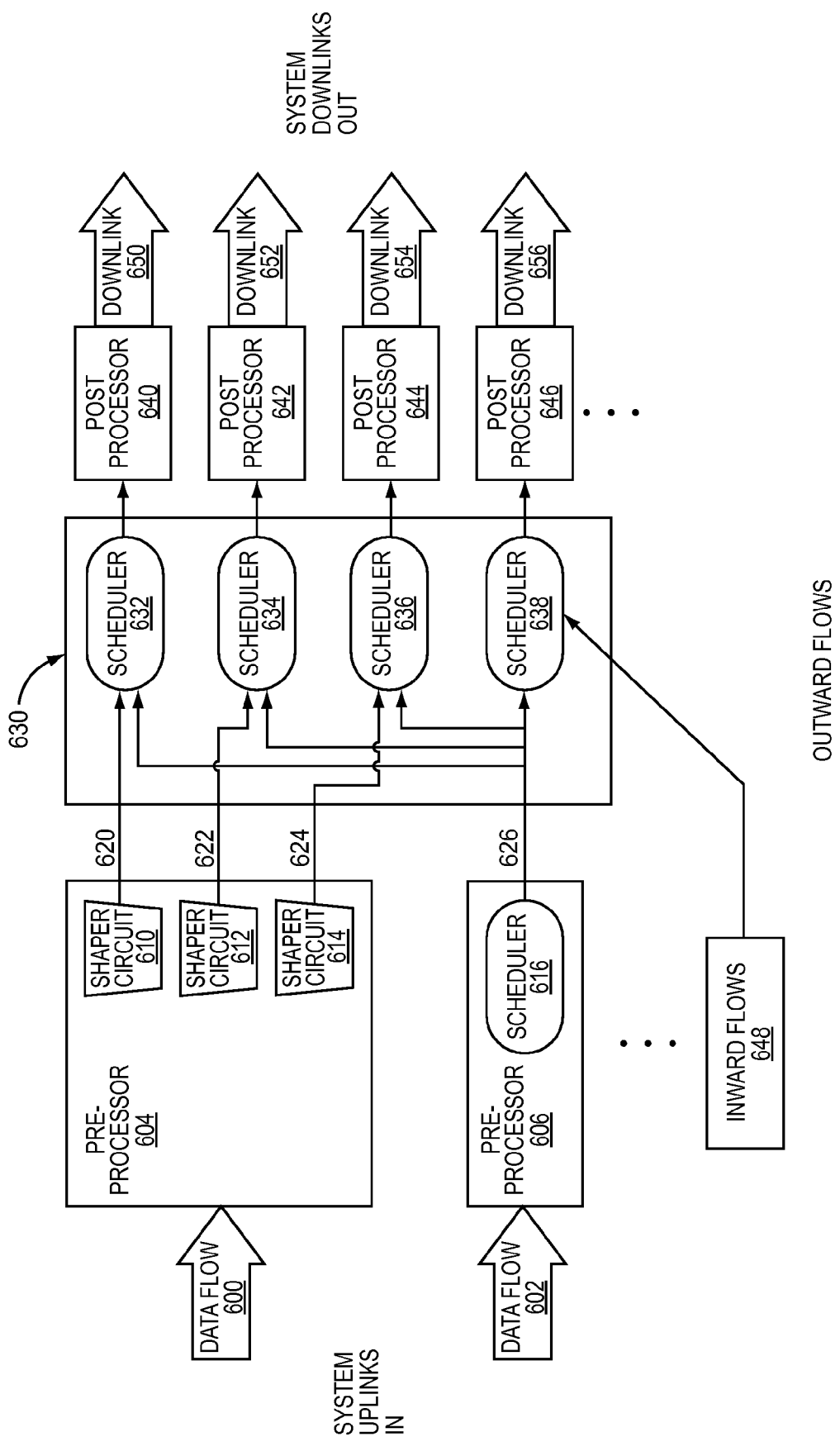
FIG. 8 illustrates an embodiment of aspects of the present invention, including the system unidirectional flow out of a multiplexer.

FIGS. 7 and 8 illustrate an embodiment of aspects of the present invention in the form of a multiplexer of data, each figure representing a unidirectional flow of data through a data system, but together comprising a bidirectional flow of data through a data system. The merge of data which is primarily described in the other figure is abstracted by one of two labels: INWARD FLOWS 648 or OUTWARD FLOWS 590. For example, the data source labeled OUTWARD FLOWS 590 in FIG. 7 is the same data carried on link 626 in FIG. 8. Other than the shared flows represented by INWARD FLOWS or OUTWARD FLOWS labels, the flows of FIG. 7 are primarily the unidirectional flow of data inward from the downlinks towards the uplinks and the flows of FIG. 8 are primarily the unidirectional flow of data outward from the uplinks towards the downlinks. The multiplexer supports flows which traverse multiple processors, therefore there are a small number of flows on FIGS. 7 and 8 which do not represent flows between an uplink and a downlink, or vice-versa, but instead represent flows between two processors which both have a downlink or two processors which both have an uplink.

According to FIG. 7, a series of system downlink inputs 500, 502, and 504 are preprocessed by preprocessors 520, 522, and 524 respectively. Preprocessor 520 comprises rate shaping circuits 540 and 542. Preprocessor 520 shapes the aggregate bandwidth to allow merge processing. Preprocessor 520 also shapes flows per destination to selectively avoid flow control schemes where advantageous, such as to destination 592. In an alternative embodiment, the preprocessor may optionally be given priority selection at a scheduler.

Preprocessor 522 comprises rate shaping circuit 544 and scheduling circuit 546. Preprocessor 522 shapes aggregate bandwidth in the rate shaping circuit 544, in preparation for the downstream merge. The preprocessor may also schedule bandwidth which does not require the undersubscribed merge downstream, instead relying on flow control to limit the bandwidth. As illustrated in FIG. 7, the output from the rate shaper circuit 544 travels over data link 564 to the undersubscribed merge circuit 581 of multiplexer 580, while the data flow output from the scheduler circuit 546 travels over data link 566 to scheduler circuit 586 of multiplexer 580. The links coming from the same preprocessor do not necessarily represent two physical links, for example flows 564 and 566 may be carried over the same physical link even though they are depicted as two different data links in FIG. 7.

Preprocessor 524 comprises scheduling circuit 548. Preprocessor 524 schedules data with the scheduler circuit 548 while respecting per destination flow control from the queue co-located with scheduler circuit 586. The output of scheduling circuit 548 travels over data link 568 to the scheduling circuit 586 of multiplexer 580.

As depicted in FIG. 7, Preprocessor 532 could have a different role in the system than do Preprocessors 520, 522, and 524. Preprocessor 532 does not have any flows towards Postprocessor 592, which may imply that the system implementation does not have a requirement for data flow between Preprocessor 532 and Postprocessor 592, or, as is the case with the preferred embodiment, Preprocessor 532 is actually the same processing entity as Postprocessor 592. In this preferred embodiment, the data link 512 could be an additional system downlink, an additional system uplink, or it may not actually exist if all data entering Postprocessor 592 on link 588 actually returns to the multiplexer via link 570. An example data flow could be enter the system on downlink 500 where data processing first occurs on Preprocessor 520; traverse link 560; undersubscribed merge at 581 onto link 582; traverse a queue and scheduler 584 to link 588; enter Postprocessor 592 where more data processing occurs; hairpin back through the same processor, now called Preprocessor 532; traverse link 570; schedule through Scheduler 586 to link 589; process data one final time in Postprocessor 594; and finally transmit out system uplink 598.

As illustrated in FIG. 7, the preprocessed output of preprocessors 520, 522, 524, and 532 and the OUTWARD FLOWS 590, is carried by data links to the multiplexer 580. Multiplexer 580 comprises the undersubscribed merge circuit 581 which is connected by data link 582 to scheduling circuits 584 and 586. Scheduling circuit 584 can be configured in a number of ways to provide data scheduling from the connected data links from data sources 500 and 502. In a preferred embodiment, scheduler 584 can be configured to provide full access to the data bandwidth from data sources 500 and 502. Any remaining bandwidth will pass to the outward flows processing 590 which provides flow control back to the data source should the scheduler queue become congested. Likewise, scheduling circuit 586 can be configured in a number of ways to provide data scheduling from the connected data links from data sources 500, 502, 504, and 512. In a preferred embodiment, scheduler 584 can be configured to provide a weight to each of the data flows from each of the data sources and schedule the data flows according the weight given the data flows. Many methods are possible for flow controlling the sources of data into scheduler 584, usually requiring a queue per data source collocated with the scheduler and flow control to stop or slow the data source triggered from queue fill.

The data output of scheduling circuits 584 and 586 travels from the multiplexer over data links 588 and 589, respectively, to data Postprocessors 592 and 594, respectively, then over data links 596 and 598, respectively, out of the system and toward the data destination. The data processing provided by Postprocessors 592 and 594 may alternately result in data discard or data return to the multiplexer. In the preferred embodiment, the multiplexer is co-located with the primary destination of data processing, in this figure processor 594.

FIG. 8 illustrates an embodiment of aspects of the present invention, including the system unidirectional flow out from the multiplexer. Specifically, data flows 600 and 602 flow into preprocessing units 604 and 606, respectively. Preprocessor 604 provides bandwidth shaper circuits 610, 612, and 614 to shape bandwidth per destination thus ensuring no oversubscription of bandwidth to the per destination scheduler where data from the sources must merge within the multiplexer before forwarding on to the destination. Preprocessor 606 comprises a scheduler circuit for scheduling traffic to destinations, respecting flow control back from each destination to insure no data loss occurs. In a preferred embodiment, Preprocessor 606 is the primary source of data for the outward multiplexer, however Preprocessor 604 requires a priority merge capability in order to push system complexities into Preprocessor 606 scheduler 616.

Preprocessor 604 provides input to multiplexer 630 through data links 620, 622, and 624. Data links 620, 622, and 624 may share one or more physical links. Preprocessor 606 provides input to multiplexer 630 through data links 626. Multiplexer 630 comprises scheduling circuits 632, 634, 636, and 638. In a configuration of a preferred embodiment, scheduling circuit 632 guarantees to forward the full bandwidth offered from preprocessor 604. Any remaining bandwidth is allocated to data flows from preprocessor 606. Scheduling circuits 634 and 636 also guarantee full processing for the offered bandwidth from preprocessor 604 and allocate any remaining bandwidth to data flows from preprocessor 606. The outward flows 648 are flows from FIG. 7 which need to be merged back into the overall outward flows of FIG. 8. In a preferred embodiment, the outward flows are associated with data passing through more than just a single pair of processors, for example Postprocessor 646 might be the same physical processor as Preprocessor 604. In this preferred embodiment, the inward flows 648 can transmit out of any of the system downlinks 650, 652, 654, or 656; however Scheduler 638 first sends the data to Postprocessor 646, which is the same processor as Preprocessor 604, before the data is returned to the multiplexer via links 620, 622 or 624.

When data is scheduled by scheduling circuits 632, 634, 636, and 638, the data then processed by Postprocessor 640, 642, 644, and 646 respectively before leaving the system on the system downlinks 650, 652, 654, and 656 respectively. In the preferred embodiment, processor 646/604 could contain system uplinks if its primary responsibility is as depicted in Preprocessor 604, system downlinks if its primary responsibility is as depicted in Postprocessor 646, or no links at all if all data which enters the processor from the multiplexer is discarded, consumed or returned to the multiplexer.

It is to be understood that the present invention illustrated herein may be implemented by those of ordinary skill in the art as a computer program product having a medium with a computer program embodied thereon. The computer program product is capable of being loaded and executed on the appropriate computer processing device(s) in order to carry out the method or process steps described. Appropriate computer program code in combination with hardware implements many of the elements of the present invention. This computer code is often stored on storage media. This media can be a diskette, hard disk, CD-ROM, optical storage media, tape, or any similar media. The media can also be a memory storage device or collection of memory storage devices such as read-only memory (ROM) or random access memory (RAM). Additionally, the computer program code can be transferred to the appropriate hardware over a data network.

The present invention has been described, in part, with reference to flowchart illustration(s) or message diagram(s). It will be understood that each block of the flowchart illustration(s) or message diagram(s), and combinations of blocks in the flowchart illustration(s) or message diagram(s), can be implemented by computer program instructions.

These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block(s) or message diagram(s). These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block(s). The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block(s) or message diagram(s).

Accordingly, block(s) of flowchart illustration(s) or message diagram(s) support combinations of means for performing the specified functions, combinations of steps for performing the specified functions and program instruction means for performing the specified functions. It will also be understood that each block of flowchart illustration(s) or message diagram(s), and combinations of blocks in flowchart illustration(s), or message diagram(s) can be implemented by special purpose hardware-based computer systems that perform the specified functions or steps, or combinations of special purpose hardware and computer instructions.

Those skilled in the art will also recognize improvements and modifications to the preferred embodiments of the present invention. All such improvements and modifications are considered within the scope of the concepts disclosed herein.

What is claimed is:

1. A method for controlling data transfer in a network comprising;
  a) receiving rate-limited data from two or more data sources at one or more undersubscribed merge circuits, wherein the one or more undersubscribed merge circuits has a bandwidth that is greater than a bandwidth required to transmit the received rate-limited data;
  b) combining data flows from the two or more data sources with the one or more undersubscribed merge circuits to provide a first merged data flow containing the data from the two or more data sources;
  c) transmitting the first merged data flow to one or more oversubscribed merge circuits, wherein the one or more oversubscribed merge circuits has a bandwidth that is less than a bandwidth required to transmit the first merged data flow;
  d) combining the first merged data flow with at least one other data flow at the one or more oversubscribed merge circuits to provide a second merged data flow; and
  e) provisioning the second merged data flow for transmission to the data's next processing stage.

2. The method of claim 1, wherein the step of combining data flows in the one or more undersubscribed merge circuits includes delaying a data flow when a merge conflict arises.

3. The method of claim 1, wherein the two or more data sources are configured such that a sum of data offered to the one or more undersubscribed merge circuits is less than a capacity of a data link transmitting the first merged data flow.

4. The method of claim 3, wherein the two or more data sources are limited in rate and burst size.

5. The method of claim 2, wherein the one or more undersubscribed merge circuits include one or more input queues.

6. The method of claim 5, wherein the one or more undersubscribed merge circuits merge from one or more input queues based on a scheduling algorithm between input queues where all input queues have an equal probability of selection by the algorithm.

7. The method of claim 5, wherein the one or more undersubscribed merge circuits choose data to merge from the one or more input queues with queue priority derived from the depth of the one or more input queues.

8. The method of claim 5, wherein the one or more undersubscribed merge circuits merge data in the order of arrival to the one or more undersubscribed merge circuits.

9. The method of claim 2, wherein the one or more undersubscribed merge circuits do not include a method of flow-controlling back to the two or more data sources.

10. The method of claim 2, wherein the one or more undersubscribed merge circuits are cascaded.

11. The method of claim 1, wherein the first merged data flow is distributed to multiple queues at the one or more undersubscribed merge circuits.

12. The method of claim 1, wherein the one or more oversubscribed merge circuits further use a method of flow-controlling data sources resulting in the two or more data sources slowing or stopping data flow for a period of time.

13. The method of claim 12, wherein the method of flow-controlling data sources comprises one or more input queues.

14. The method of claim 13, wherein the method of flow-controlling data sources comprises flow-controlling sources based on input queue congestion.

15. The method of claim 14, wherein the input queue congestion is detected from an input queue fill exceeding a queue fill threshold, whereby the input queue fill and the queue fill threshold can be associated with one or more data sources.

16. The method of claim 15, wherein the input queue congestion is signaled back to one or more of the two or more data sources as an XOFF/XON flow control.

17. The method of claim 15, wherein the input queue congestion is signaled back to one or more of the two or more data sources as a rate modification message.

18. The method of claim 13, wherein the method of flow-controlling data sources is a credit based flow control method.

19. The method of claim 18, wherein the credit based flow control method further comprises a configured number of credits per source-destination pair, and wherein the one or more input queues are sized to always accept data represented by a sum of credits for sources sending data to the one or more input queues.

20. The method of claim 19, wherein the credit based flow control method further comprises a credit loop providing data flow from a source to a destination queue wherein credits flow back to the source for the respective destination queue when data for the source-destination pair exits the destination queue, and wherein credits flow back to the source in-band with data in the reverse direction, out-of-band in a messaging channel, or out-of-band in a different bus or network.

21. The method of claim 1, wherein the one or more undersubscribed merge circuits are not collocated with the one or more oversubscribed merge circuits, and wherein links carrying data between the two or more data sources and the one or more undersubscribed merge circuits have a higher total capacity than a link carrying the first merged data flow.

22. The method of claim 1, wherein the one or more undersubscribed merge circuits are collocated with the one or more oversubscribed merge circuits, and wherein the one or more undersubscribed merge circuits reduce the number of queues at the one or more oversubscribed merge circuits.

23. A system for controlling data transfer in a network, comprising:
  a) one or more undersubscribed merge circuits disposed to:
    i) receive rate-limited data from two or more data sources, wherein the one or more undersubscribed merge circuits has a bandwidth that is greater than a bandwidth required to transmit the received rate-limited data;

ii) combine data flows from the two or more data sources to provide a first merged data flow;

iii) transmit the first merged data flow; and b) one or more oversubscribed merge circuits, wherein the one or more oversubscribed merge circuits has a bandwidth that is less than a bandwidth required to transmit the first merged data flow, disposed to:

i) receive the first merged data flow;

ii) combine the first merged data flow with at least one other data flow to provide a second merged data flow; and iii) provision the second merged data flow for transmission to a destination for the data.

24. The system of claim 23 wherein the one or more undersubscribed merge circuits are operable to delay the data flow when a merge conflict arises.

25. The system of claim 24, wherein the one or more undersubscribed circuits further include one or more data selection circuit input queues.

26. The system of claim 23, wherein the system configures the two or more data sources such that a sum of data offered to the one or more undersubscribed merge circuits is less than the capacity of the link carrying the first merged data flow.

27. The system of claim 26, wherein the two or more data sources are limited in rate and burst size affecting a known window in time where potential merge conflicts can arise in the one or more undersubscribed merge circuits thus specifying a maximum amount of data which can be involved in a merge conflict.

28. The system of claim 27, further comprising a mechanism for alleviating the merge conflict by delaying data in one or more data selection circuit input queues, and wherein a data selection circuit chooses data to merge from the one or more data selection circuit input queues based on a scheduling algorithm between the one or more data selection circuit input queues where all of the one or more data selection circuit input queues have an equal probability of selection, or where input queue priority is determined by queue depth or by age of data in the one or more data selection circuit input queues.

* * * * *